(12) United States Patent
Kurokawa

(10) Patent No.: US 8,718,027 B2
(45) Date of Patent: May 6, 2014

(54) WIRELESS COMMUNICATION SYSTEM, WIRELESS ACCESS POINT, COMMUNICATION CONTROL METHOD AND COMPUTER-READABLE MEDIUM

(75) Inventor: Hideki Kurokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1372 days.

(21) Appl. No.: 11/822,745

(22) Filed: Jul. 9, 2007

(65) Prior Publication Data

US 2008/0013513 A1    Jan. 17, 2008

(30) Foreign Application Priority Data

Jul. 10, 2006    (JP) ................... 2006-189393

(51) Int. Cl.
*H04W 4/00*    (2009.01)
(52) U.S. Cl.
USPC ........ 370/338; 370/235; 370/473; 455/414.1; 455/414.2; 455/433
(58) Field of Classification Search
None
See application file for complete search history.

(56) References Cited

U.S. PATENT DOCUMENTS

| 2002/0181428 | A1* | 12/2002 | Kruys | 370/338 |
|---|---|---|---|---|
| 2004/0005878 | A1* | 1/2004 | Olin et al. | 455/414.1 |
| 2005/0147041 | A1* | 7/2005 | Zaki et al. | 370/235 |
| 2006/0078001 | A1* | 4/2006 | Chandra et al. | 370/473 |

FOREIGN PATENT DOCUMENTS

| JP | 2001-203713 A | 7/2001 |
|---|---|---|
| JP | 2004-512787 | 4/2004 |
| JP | 2006-048330 A | 2/2006 |
| WO | WO 02/28026 A1 | 4/2002 |

OTHER PUBLICATIONS

Baba, Satoshi, "Mesh gata musen LAN", Nikkei Communications, vol. 438, pp. 86-94, May 15, 2005.
Japanese Patent Application No. 2006-189393 Office Action Dated Nov. 24, 2010, with partial English Translation.

* cited by examiner

*Primary Examiner* — Manpreet Matharu
(74) *Attorney, Agent, or Firm* — McGinn IP Law Group, PLLC

(57) ABSTRACT

In a first control mode employed when a wired communication line is used as the backhaul, a wireless access point operates as follows. (1) The access point processes its own control packets for management by itself. (2) The access point communicates packets in which an information item for processing in a controller or a control server is added to user traffic from a client connected to the access point. (3) The access point conducts proxy processing for a control packet for management of a second wireless access point connected to the wireless communication side of the access point. (4) The access point compresses a control packet for management sent from a system controller to the second wireless access point to thereby achieve a frame conversion and then sends the packet to the wireless communication side. This resultantly reduces the traffic on the backhaul wireless communication line.

24 Claims, 5 Drawing Sheets

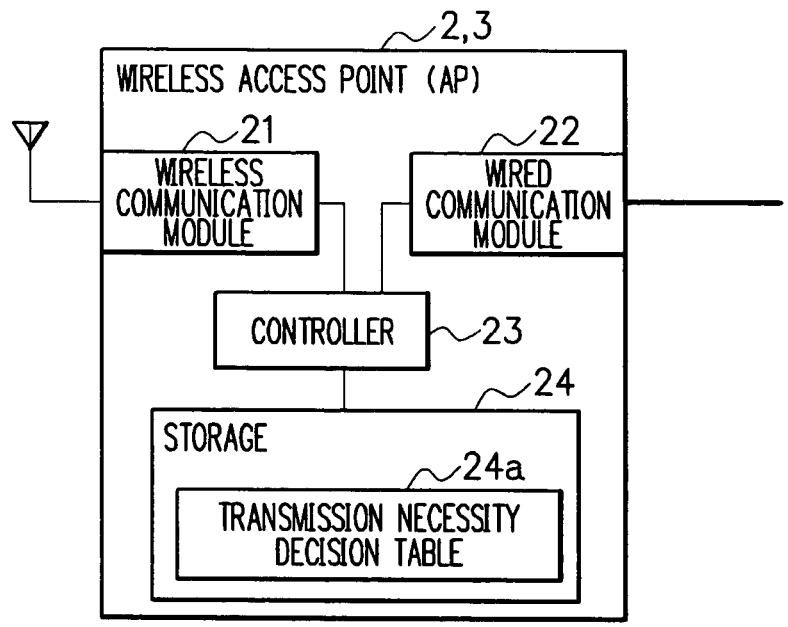

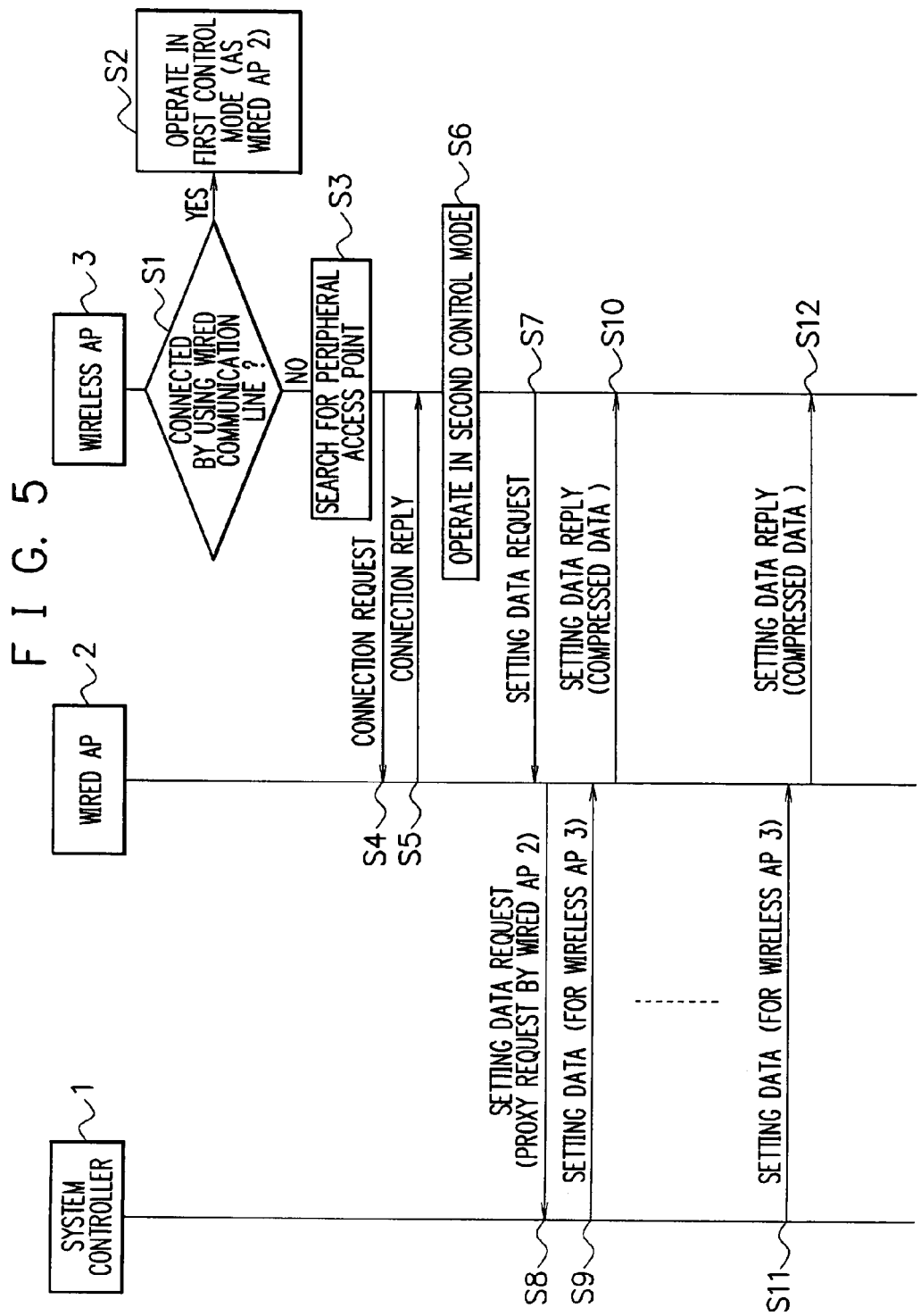

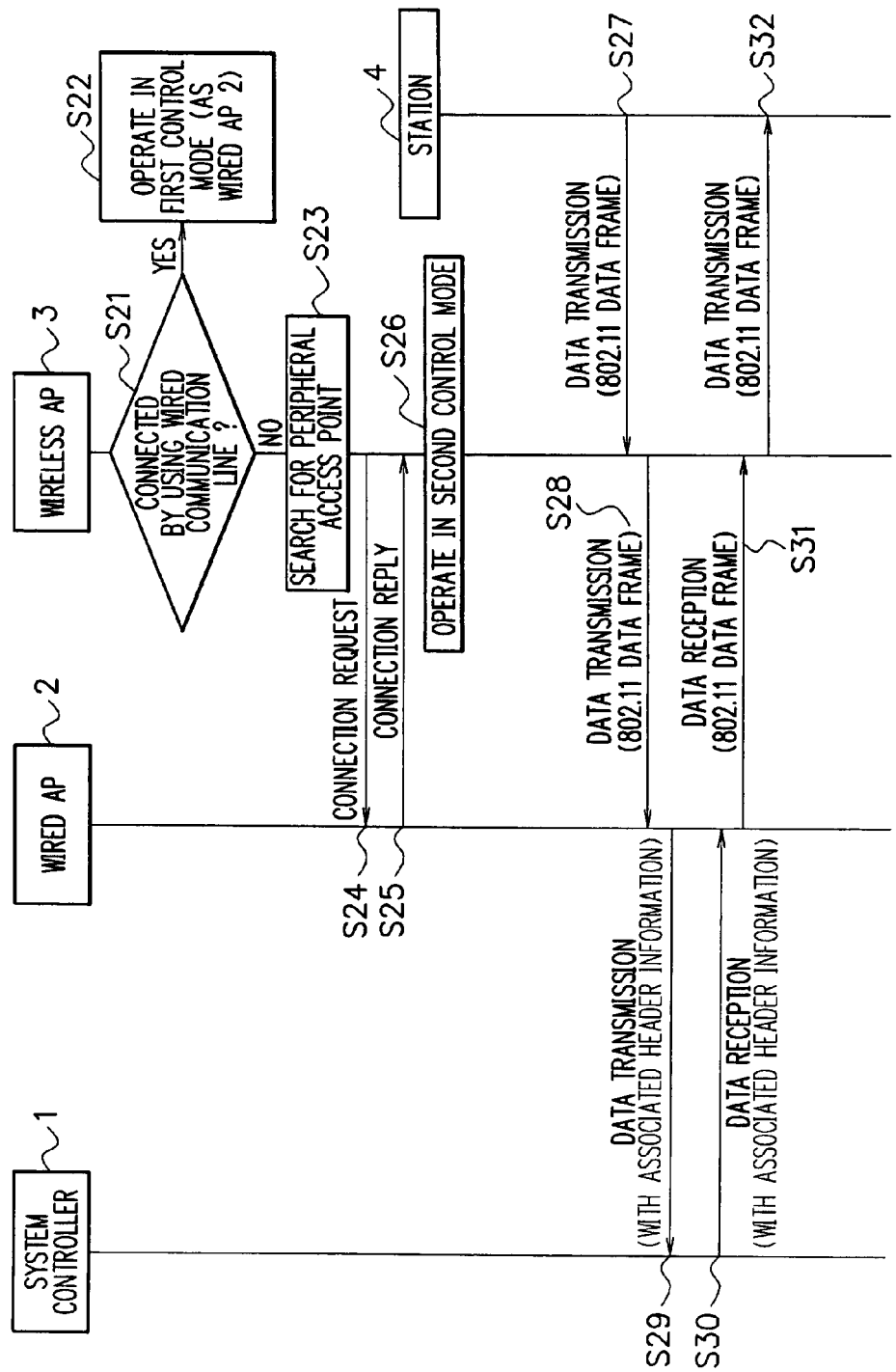

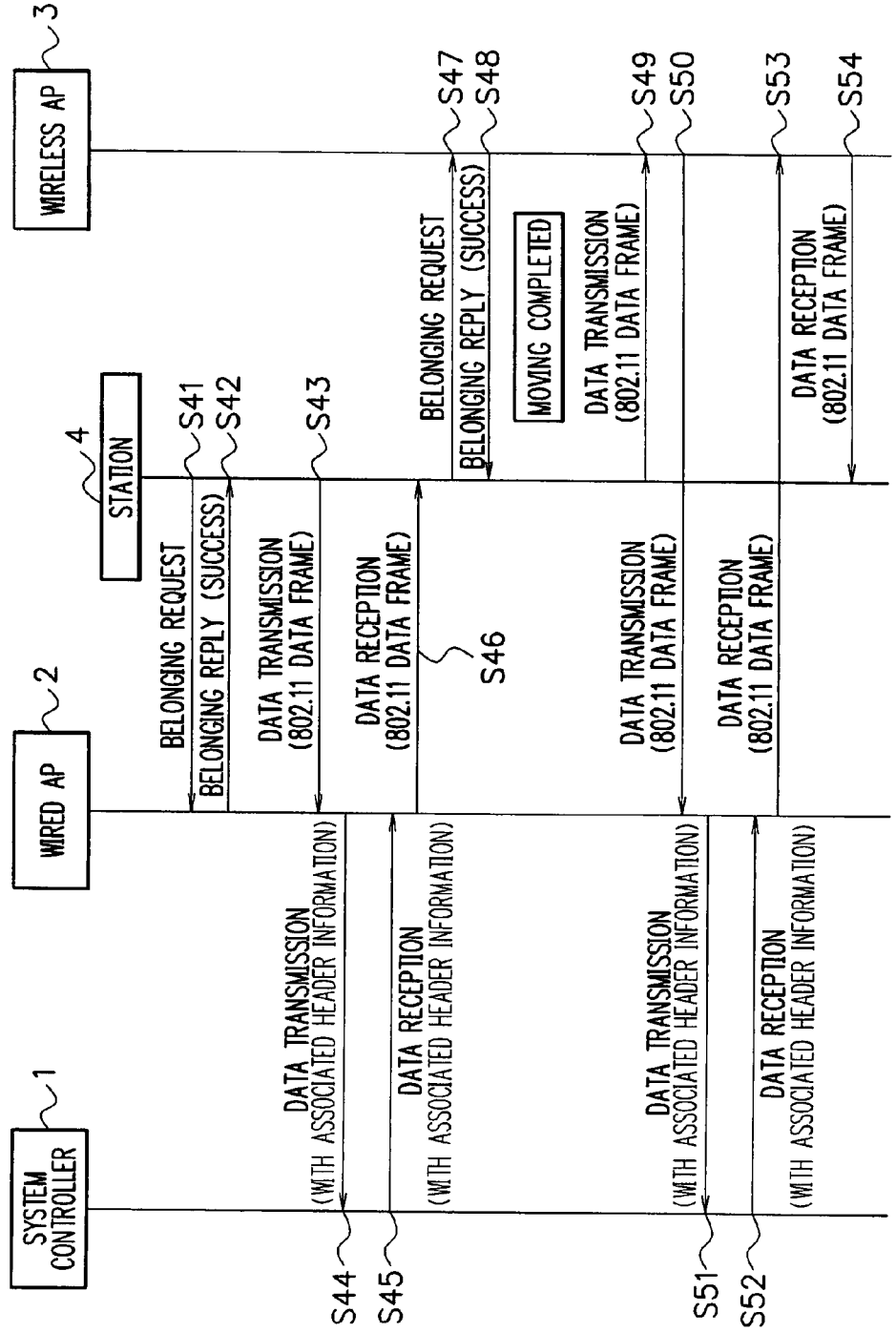

WIRELESS COMMUNICATION SYSTEM, WIRELESS ACCESS POINT, COMMUNICATION CONTROL METHOD AND COMPUTER-READABLE MEDIUM

This application is based upon and claims the benefit of priority from Japanese patent application No. 2006-189393, filed on Jul. 10, 2006, the disclosure of which is incorporated herein in its entirety by reference.

BACKGROUND OF THE INVENTION

1. Field of the Invention

The present invention pertains to a wireless communication system, a wireless access point, a communication control method, and a computer-readable medium having a communication control program including wireless access points using only wired communication lines and wireless access points employing wireless communication lines for connection to a backbone communication line.

2. Description of the Related Art

Recently, to centralize management of setting of wireless access points and management the access points during operation as well as the management of connection of wireless communication terminals or stations and sessions the stations for simplification of the management, there has been generally employed a wireless network including a system controller, e.g., an access point controller or a control server to manage the wireless access points and the wireless network.

In such wireless network simplified by use of the centralized management, the wireless access point includes a function for encapsulation in general. According to the encapsulation, the access point delivers user data from a station connected thereto to a destination of the data with a relay packet header (associated header information) added to the user data for the processing by, for example, the system controller.

In the wireless network, various control packets are communicated between the system controller and the wireless access points to manage the overall operation of the network. The control packets include information, for example, a setting parameter of a wireless access point and a change parameter during operation thereof, status information of the access point, connection information of a station, and a change processing instruction of an encryption key due to delivery of an encryption key or expiration of life time thereof.

In a conventional wireless communication system described in, for example, Japanese Patent Application Laid-Open Publication of PCT No. 2004-512787 (document 1), there is adopted an Internet Protocol Adaptive Layer (IPAL). By linking a data packet with an IPAL information packet, the header of a relatively small data packet is dispensed with to thereby lower the backhaul traffic.

Description will now be given of problems in the conventional techniques.

In a situation of the wireless network managed in a centralized way by use of the system controller, when a wireless communication line is employed as the backhaul communication line for connection from the wireless access point to the backbone network such as a wired Local Area Network (LAN) to resultantly configure a mesh network, there arise problems as below.

(Problem 1)

The associated header information added to the user traffic through the encapsulation consumes the band of the backhaul wireless communication line between wireless access points.

(Problem 2)

Various control packets used for the management consumes the band of the backhaul wireless communication line between wireless access points.

The technique of document 1 aims to reduce the amount of data in the packet header. However, consideration has not been given to the reduction in the control packet traffic and a scheme that makes it unnecessary to add the associated header information in the encapsulation.

SUMMARY OF THE INVENTION

An exemplary object of the invention is to provide a wireless communication system, a wireless access point, a communication control method, and a communication control program capable of effectively using the backhaul wireless communication line in a wireless network in which the system is managed in a centralized manner, by reducing the traffic on the backhaul wireless communication line such as traffic of control packets and associated header information.

A wireless communication system according to an exemplary aspect of the invention includes a first wireless access point connected via a wired communication line to a backbone communication line, a second wireless access point coupled through wireless communication with the backbone communication line, and a system controller for controlling operations of the first and second access points. The first wireless access point includes a transmission decision module that selects, from control packets from the system controller, a predetermined kind of control packets and sends control packets except the predetermined kind of control packets to the second wireless access point.

A wireless communication system according to an exemplary aspect of the invention includes a first wireless access point connected via a wired communication line to a backbone communication line and a second wireless access point coupled through a wireless communication with a backbone communication line. The second wireless access point includes a transfer module for transferring a packet from a station belonging thereto to the first wireless access point. The first wireless access point includes and associated header information adding module that adds associated header information to the packet received from the second wireless access point.

A wireless access point according to an exemplary aspect of the invention is connected to a system controller controlling operation of the wireless access point and a second wireless access point coupled through a wireless communication with a backbone communication line. The access point includes a transmission decision module that selects, from control packets from the system controller, a predetermined kind of control packets and sends control except the predetermined kind of control packets to the second wireless access point.

A wireless access point according to an exemplary aspect of the invention is connected via a wireless communication line to a second wireless access point coupled through wireless communication with a backbone communication line. The wireless access point includes an associated header information adding module that adds associated header information to a packet received from the second wireless access point.

A wireless access point according to an exemplary aspect of the invention is connected to another wireless access point connected via a wired communication line to a backbone communication line. The wireless access point includes a transfer module that transfers a packet from a station belonging thereto to the wireless access point to another wireless access point. Another wireless access point includes an associated header information adding module that adds associated header information to the packet received from the station.

A communication control method according to an exemplary aspect of the invention is applied to a wireless communication system including a first wireless access point connected via a wired communication line to a backbone communication line, a second wireless access point coupled through wireless communication with a backbone communication line, and a system controller for controlling operations of the first and second access points. The method includes the steps of:

receiving, by the first wireless access point, control packets from the system controller; and selecting, from the control packets from the system controller, a predetermined kind of control packets and transmitting control packets except the predetermined kind of control packets to the second wireless access point.

A communication control method according to an exemplary aspect of the invention is applied to a wireless communication system including a first wireless access point connected via a wired communication line to a backbone communication line and a second wireless access point coupled through wireless communication with a backbone communication line. The method includes:

Transferring, by the second wireless access point, a packet from a station belonging thereto to the first wireless access point; and adding, by the first wireless access point, associated header information to the packet received from the second wireless access point.

A computer-readable medium according to an exemplary aspect of the invention has a communication control program for use with a wireless communication system including a first wireless access point connected via a wired communication line to a backbone communication line, a second wireless access point coupled through wireless communication with a backbone communication line, and a system controller for controlling operations of the first and second access points. The program causes a computer to perform:

control packet receiving processing for receiving, by the first wireless access point, control packets from the system controller; and transmission decision processing for selecting, from the control packets from the system controller, a predetermined kind of control packets and transmitting control packets except the predetermined kind of control packets to the second wireless access point.

A computer-readable medium according to an exemplary aspect of the invention having a communication control program for use with a wireless communication system including a first wireless access point connected via a wired communication line to a backbone communication line and a second wireless access point coupled through wireless communication with a backbone communication line. The program causes a computer to perform:

transfer processing for transferring by the second wireless access point a packet from a station belonging thereto to the first wireless access point; and associated header information adding processing for adding, by the first wireless access point, associated header information to the packet received from the second wireless access point.

BRIEF DESCRIPTION OF THE DRAWINGS

Features of the disclosed embodiments will be described by way of the following detailed description with reference to the accompanying drawings in which:

FIG. 3 is a block diagram showing an example of a configuration of a wireless access point (wired AP 2, wireless AP 3);

FIG. 4 is a diagram showing an example of a layout of a transmission necessity decision table 24a;

FIG. 5 is a sequence chart showing a processing procedure to transmit a control packet;

FIG. 6 is a sequence chart showing a procedure to communicate a user data packet; and FIG. 7 is a sequence chart showing a processing procedure to communicate a user data packet while a station 4 is moving.

DESCRIPTION OF EXEMPLARY EMBODIMENTS

Referring next to the drawings, description will be given in detail of exemplary embodiments of a wireless communication system, a wireless access point, a communication control method, and a communication control program.

A system includes wireless access points (AP) or wireless base stations, wireless clients (wireless communication terminals or stations), a system controller including a function to manage the access points and the stations, and a wireless communication line that is adopted for communication between access points and is also employed as a communication path up to a connecting point for connection to a wired LAN.

Figure 1:
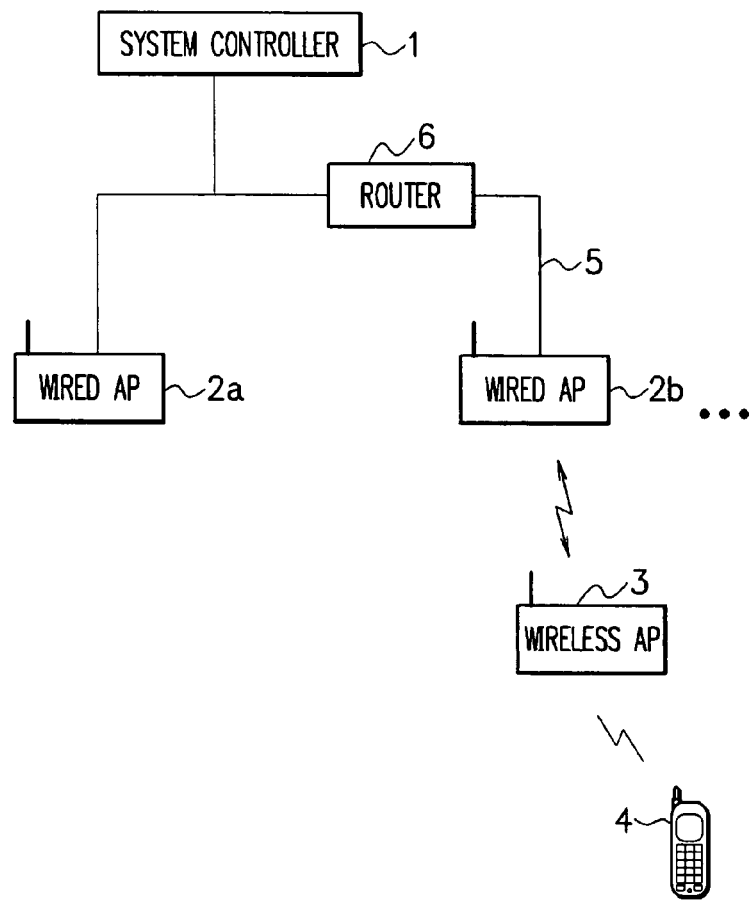
FIG. 1 is a schematic block diagram showing a wireless communication system.
Figure 2:
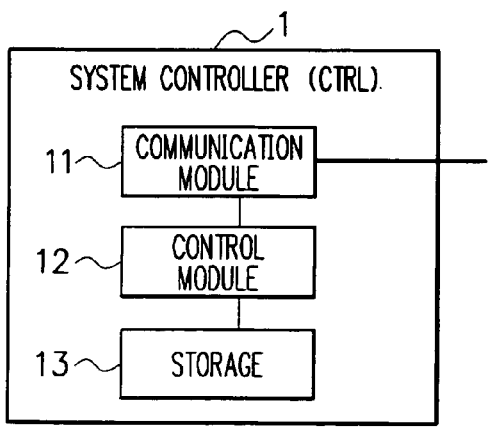
FIG. 2 is a block diagram showing an example of structure of a system controller 1.

The wireless communication system includes, as can be seen from FIG. 1, a system controller 1, access points (wired AP; first wireless base station) 2 connected only via a wired communication line to a backbone communication line such as a wired LAN, and access points (wireless AP; second wireless base station) 3 coupled through wireless communication to a backbone communication line. When a station 4 belongs to the wireless access point 2 or the wireless access point 3, it is possible for the station 4 to communicate wirelessly with another device such as a second station.

The system controller 1 is connected via a wired network 5 such as a wired LAN to the wired access point 2. The wired network 5 is coupled via a router (inter-network connecting device) 6 to networks using mutually different network addresses and net masks for the inter-network communication.

The controller 1 includes a communication module 11 to communicate with other devices such as the wired access point 2 and the wireless access point 3, a control module 12 to supervise the overall operation of the system control unit 1, and a storage unit 13 to store information to manage the access points 2 and 3.

The wired access point 2 and the wireless access point 3 are equivalent to each other as hardware. However, the operation mode varies depending on the communication line connected thereto, i.e., a wireless communication line or a wired communication line. Therefore, the different names are given respectively for the access points 2 and 3 for convenience.

As shown in FIG. 3, each of the wireless access points (the wired AP 2 and the wireless AP 3) includes a wireless communication module 21 to communicate wirelessly with other devices such as the station 4, a wired communication module 22 to communicate via a wired communication line with other devices such the system controller 1, a control module 23 to supervise the overall operation of the access point, and a storage unit 24.

The storage unit 24 stores a transmission necessity decision table 24a to determine whether a packet is to be sent from the system controller 1.

As can be seen from FIG. 4, the table 24a indicates, when the access point is employed as the wired access point 2, first packets to be delivered to the wireless access point 3 via wireless communication between access points and second packets other than the first packets.

According to the example of FIG. 4, the packets to be fed to the access point 3 are classified into control packets associated with the change of an access point setting, and control packets regarding the monitor of access point state. The table 24a also includes a control packet used to control movement of a client (a station 4), the packet being not sent to the access point 3, namely, the delivery of the packet is stopped at the wired access point.

As above, in the wireless network in which the management of the access point setting and the management of the operation as well as the management of connection information of clients and the session management are carried out by the system controller 1 in a simplified and centralized way, each of the access points includes a function to conduct a changeover operation between two control modes to operate as the wired access point 2 and the wireless access point 3.

In the first mode, the access point is connected via a wired communication line to the backhaul (anchor access point mode). In this mode, the access point conducts proxy processing for a management packet of an access point linked with a wireless communication side. Also, for a transmission packet from a client coupled with an access point connected to a wireless communication side, the access point adds an information item required for the management to the packet and communicates information via a wired LAN with the system controller 1, to thereby supervise the operation.

In the second mode, a wireless LAN is adopted as the backhaul (wireless backhaul mode). That is, a packet of a client under control of the access point is delivered to the wired access point 2 operating in the anchor access point mode.

In the first control mode employed when a wired communication line is adopted as the backhaul, the access point operates as follows:

(1) The access point processes its own control packet by itself;

(2) To a packet of the user traffic from a client connected to the access point, the access point adds an information item required for the processing in the controller or a control server to the packet and then communicates the packet;

(3) The access point executes proxy processing of a control packet for management of the wireless access point 3 connected to the wireless communication side;

(4) The access point compresses a control packet for management delivered from the system controller 1 to the wireless access point 3 connected to the wireless communication side, conducts a frame conversion for the packet, and then sends the packet to the wireless communication side.

In the second control mode utilized when a wireless LAN is adopted as the backhaul, the access station conducts operation as follows:

(1) At reception of a packet of the user traffic from a client connected to the access point, the access point communicates the packet without adding the information item required for the processing in the controller or a control server to the packet.

(2) The access point compresses the management information of the client connected thereto and the control packet required to control the access point and transmits the packet to the backhaul wireless communication line for wireless communication between access points.

Referring next to the drawings, description will be given in detail of operation of an exemplary embodiment.

First, referring to the sequence chart shown in FIG. 5, description will be given of a procedure of control packet transmission processing by the wireless access point serving as the wireless access point 3 of a wireless communication system.

When turned on, the access point makes a check to determine whether the access point is linked with a connector, not shown, to connect via wired connection to the wired communication module 22 (step S1). If it is confirmed that the access point is coupled with the connector and is connected via a wired communication line to another device, the access point is activated in the first control mode to operate as the wired access point 2 (step S2).

If it is not confirmed that the access point is connected to the connector (no in step S1), the access point makes a search by use of the wireless communication module 21 to determine whether there exists a second access point wirelessly communicable with the access point in the peripheral region thereof (step S3).

If such second access point is present, the access point delivers a connection request to the second access point (step S4). On receiving a connection reply to the connection request (step S5), the access point starts operation in the second control mode as the wireless access point 3 to be connected via wireless communication to the second access point (step S6).

In the example of FIG. 5, the second access point is the wired access point 2.

After starting operation, the wireless access point 3 sends to the wired access point 2 a setting data request by using a packet header through wireless communication between wireless access points (step S7).

The setting data request packet includes a packet header for the communication between access points, specifically, a private address on the wireless LAN between access points. Therefore, the packet cannot be directly delivered via the router 6 to the system controller 1.

To cope with the difficulty, the wired access point 2 operates as a proxy to send the setting data request for the wireless access point 3 to the system controller 1 (step S8).

Having received the setting data for the access point 3 from the system controller 1 (step S9), the wired access point 2 converts the setting data into compressed data and feeds the data to the wireless access point 3 through wireless communication between access points (step S10).

Thereafter, each time the setting data for the wireless access point 3 is received from the system controller 1 (step S11), the wired access point 2 compresses the setting data into compressed data and sends the data to the access point 3 via the wireless communication between access points (step S12).

As above, the access point 2 compresses by the control module 23 each of various control packets to be delivered to the access point 3 and transmits the packet to the access point 3 through the wireless communication.

Of the control packets from the system controller, each control packet of the kind which is determined, by the transmission necessity decision table 24a, to be sent up to the wireless access point 3 is converted by the access point 2 into compressed data to be delivered to the access point 3.

That is, at reception of a control packet such as the access point setting data that is issued from the system controller 1 to be addressed to the wireless access point 3, the wired access point 2 determines the kind of the packet by referring to the table 24a. If the packet is of the kind that is to be fed up to the wireless access point 3, the access point 2 converts the packet into compressed data and sends the data to the access point 3.

On the other hand, at reception of a packet that is determined according to the table 24a not to be transmitted to the access point 3, namely, a packet of which the delivery is to be stopped at the access point 2, the access point 2 does not conduct the above operation, namely, does not send the packet to the access point 3, but stops the delivery of the packet at the access point 2.

Any control packet of a kind that cannot be appropriately classified according to the transmission necessity decision table 24a may be sent as compressed data to the wireless access point 3.

Subsequently, referring to the sequence chart of FIG. 6, description will be given of a processing procedure to transmit a user data packet by the wireless access point serving as the wireless access point 3 in a wireless communication system.

When the access point is turned on, the access point confirms, like in the operation described in conjunction with FIG. 5, whether the access point is coupled with a connector, not shown, to connect via wired connection to the wired communication module 22 (step S21). If the connection to the connector is confirmed and is connected via a wired communication line with another device, the access point is activated in the first control mode to operate as the wired access point 2 (step S22).

If it is not confirmed that the access point is linked with the connector (no in step S21), the access point operates as in the case of FIG. 5 to make a search by the wireless communication module 21 to determine presence or absence of a second access point in the peripheral region thereof, the second access point being wirelessly communicable with access point (step S23).

If such second access point is present, the access point delivers a connection request thereto (step S24). When a connection reply to the connection request is received (step S25), the access point initiates operation in the second control mode as the wireless access point 3 to be linked through wireless communication with the second access point (step S26).

In the example of FIG. 6, the second access point operates as the wired access point 2.

In this situation, if the station 4 belongs to the wireless access point 3 and delivers a data frame conforming to the standard of IEEE802.11 (step S27), the access point 3 receives the data frame from the station 4 and transmits the data frame of IEEE802.11 directly to the wired access point 2 (step S28).

The access point 2 encapsulates, as a proxy of the access point 3, the data frame of IEEE802.11 from the access point 3 to deliver the data frame to the system controller 1 (step S29). That is, the wired access point 2 adds associated header information (a relay packet header) to the data frame as if a tunnel is provided, and then sends the data frame via the router 6 to the system controller 1.

When reply data is received from the system controller 1 (step S30), the access point 2 removes the associated header information from the data to obtain the data frame of IEEE802.11 and then transmits the data from through wireless communication to the access point 3 (step S31).

At reception of reply data in the data frame from the system controller 1, the access point 3 directly sends the data to the station 4 (step S32).

Referring now to the sequence chart of FIG. 7, description will be given of a processing procedure to communicate a user data packet while the station 4 is moving in the wireless communication system.

If the station 4 is in a communication area of the wired access point 2, the station 4 issues a belonging request to the access point 2 (step S41). If the belonging request is normally processed and a belonging reply is received from the access point 2 (step S42), the station 4 delivers data in a data frame of IEEE802.11 to the wired access point 2 (step S43).

The access point 2 adds associated header information to the data frame from the station 4 to encapsulate the data as if a tunnel is provided, and sends the data via the router 6 to the system controller 1 (step S44).

When reply data is received from the system controller 1 (step S45), the access point 2 removes the associated header information from the encapsulated data to obtain the data frame of IEEE802.11 and delivers the data frame through wireless communication to the station 4 (step S46).

During the wireless communication, if the station 4 starts moving from the communication area of the access point 2 to the communication area of the access point 3, the station 4 detects a change in the received radio wave state to start handover processing and then issues a belonging request to the access point 3 (step S47).

If the belonging request is appropriately processed, namely, the processing of the request is normally executed and a belonging reply is received from the access point 3 (step S48), the handover processing is normally terminated. Therefore, the station 4 transmits the data in a data frame of IEEE802.11 to the access point 3 (step S49).

When the data frame is received from the station 4, the access point 3 directly feeds the data frame to the wired access point 2 (step S50).

The wired access point 2 encapsulates, as a proxy of the wireless access point 3, the data frame from the access point 3 and sends the data frame to the system controller (step S51). That is, the access point 2 adds associated header information to the data frame from the access point 3 to produce an encapsulated data frame as if a tunnel is provided, and transmits the data frame via the router 6 to the system controller 1.

When reply data is received from the system controller 1 (step S52), the access point 2 removes the associated header information from the data to attain the data frame of IEEE802.11 and feeds the data frame wirelessly to the access point 3 (step S53).

On receiving reply data in the frame from the controller 1, the access point 3 directly transmits the data to the station 4 (step S54).

As described above, in the wireless communication system, to centralize the management of setting of wireless access points and management thereof during the operation as well as to centralize the management of connection information of clients and sessions thereof for simplification of the management, there is employed the system controller 1 such as an access point controller or a controller server. Also, there is configured a wireless mesh network in which a wireless communication line is adopted for communication between access points and is also used as the backhaul communication line up to a connecting point for connection to a wired LAN.

In the wireless communication system, each of the access points includes a function to dynamically accomplish a changeover operation between the first control mode employed when a wired communication line is used as the backhaul and the second control mode adopted when a wireless LAN is utilized as the backhaul.

Therefore, due to the associated header information (relay packet header) added to the user traffic for encapsulation of the data, it is possible to prevent the disadvantageous event in which the band of the backhaul wireless communication line is excessively consumed. Moreover, the limited band of the backhaul wireless communication line can be efficiently used.

That is, in the conventional technique of the function to deliver the user packet from the station, the wireless access point 3 encapsulates the packet to send the packet to the wired access point 2. However, according to exemplary embodiments, the access point 3 directly transmits the data frame of IEEE802.11 to the access point 2 without encapsulating the frame. The access point 2 receives the data frame and then encapsulates the frame by adding associated header information to the packet.

Furthermore, if the access point 2 receives a packet from, for example, the system controller 1 to be fed to the access point 3 and the packet has been encapsulated, the access point 2 removes the associated header information from the encapsulated packet to deliver the packet to the access point 3.

As a result, the traffic on the backhaul wireless communication line associated with wireless communication between the wireless access point 3 and the wired access point 2 can be reduced by the quantity of the associated header information used for the encapsulation. Therefore, the traffic on the backhaul wireless communication line can be lowered and the limited bandwidth is effectively used.

Furthermore, from the control packets for access point management sent from the system controller 1, only such control packets required for the wireless access point 3 are extracted to be delivered via wireless communication between access points. This consequently prevents the disadvantageous operation in which the band of the backhaul wireless communication line is excessively consumed by the control packets not required for the access point 3. It is therefore possible to effectively utilize the limited band of the backhaul wireless communication line.

The exemplary embodiments described above are only favorable embodiments. The present invention is not restricted by the embodiments. It is to be understood that the embodiments can be changed and modified in various ways according to the technological and technical ideas in accordance with the present invention.

For example, two wired access points 2 and one wireless access points 3 are employed in the embodiments. However, the present invention is not restricted by the embodiments. It is possible to use desired numbers of the wired and wireless access points only if there is configured a wireless mesh network including wireless access points coupled by radio to the backbone communication line and wireless access points connected only by use of wired communication lines to the backbone communication line.

The processing procedure to realize each of the embodiments of the wireless communication system can also be recorded as a program in a computer-readable medium. According to the program supplied from the computer-readable medium, the functions of each exemplary embodiment are carried out by executing the program by a Central Processing Unit (CPU) of a computer constituting the system.

In this case, the present invention may also be used by supplying a group of information items including the program to an output device via the computer-readable medium or via a network from an external recording medium.

In other words, the program code read from the computer-readable medium achieves the novel functions of the present invention. The computer-readable medium having recorded computer-executable instructions as well as signals attained from the computer-recordable medium are also included in the scope of the present invention.

As the computer-readable medium, there may be adopted, for example, a floppy (registered trademark) disk, a hard disk, an optical disk, a magnetooptical disk, a Compact-Disk Read-Only Memory (CD-ROM), a CD-R, a magnetic tape, a nonvolatile memory card, an ROM, or an Electrically Erasable Programmable ROM (EEPROM).

On the basis of the program, it is possible in a wireless communication system supervised by the program to implement the functions of the respective exemplary embodiments of the wireless communication system.

Second Exemplary Embodiment

The second wireless access point may include a transfer module that transfers a packet from a station belonging thereto to the first wireless access point. The first wireless access point may include an associated header information adding module that adds associated header information to the packet received from the second wireless access point.

Third Exemplary Embodiment

The wireless communication system may further include a system controller for controlling operations of the first and second access points. The first wireless access point may include a transmission decision module that selects, from control packets from the system controller, a predetermined kind of control packets and sends control packets except the predetermined kind of control packets to the second wireless access point.

Fourth Exemplary Embodiment

The first wireless access point may include:

an associated header information removing module that removes, at a reception of a packet to be sent to the second wireless access point with associated header information added thereto, the associated header information;

a transmission module that transmits to the second wireless access point the packet from which the associated header information removing module has removed the associated header information; and a compression and transmission module that compresses a control packet to the second wireless access point and transmitting the control packet thereto.

Fifth Exemplary Embodiment

The wireless access point may further include an associated header information adding module for adding associated header information to the packet received from the second wireless access point.

Sixth Exemplary Embodiment

The wireless access point may be connected to a system controller for controlling operations of the first and second access points. The wireless access point favorably includes:

a transmission decision module that selects, from control packets from the system controller, a predetermined kind of control packets and sends control packets except the predetermined kind of control packets to the second wireless access point;

an associated header information removing module that removes, at a reception of a packet to be sent to the second wireless access point with associated header information added thereto, the associated header information;

a transmission module that transmits to the second wireless access point the packet from which the associated header information removing module has removed the associated header information; and a compression and transmission module that compresses a control packet to the second wireless access point and transmitting the control packet thereto.

Seventh Exemplary Embodiment

The communication control method may further include:
transferring by the second wireless access point a packet from a station belonging thereto to the first wireless access point; and
adding, by the first wireless access point, associated header information to the packet received from the second wireless access point.

Eighth Exemplary Embodiment

The wireless communication system may further include a system controller for controlling operations of the first and second access points and the method desirably further includes:
receiving, by the first wireless access point, control packets from the system controller; and
selecting, from the control packets from the system controller, a predetermined kind of control packets and transmitting control packets except the predetermined kind of control packets to the second wireless access point.

Ninth Exemplary Embodiment

The said selecting and transmitting control packets to the second access point may include compressing by the first wireless access point a control packet to the second wireless access point and transmitting the control packet thereto.

Tenth Exemplary Embodiment

The communication control method may further include:
receiving by the first wireless access point a packet to be sent to the second wireless access point;
removing, if the packet includes associated header information added thereto, the associated header information therefrom; and
transmitting to the second wireless access point the packet from which the associated header information has been removed.

Eleventh Exemplary Embodiment

The computer-readable medium may, when the program is executed, further cause a computer to perform:
transfer processing for transferring by the second wireless access point a packet from a station belonging thereto to the first wireless access point; and
associated header information adding processing for adding, by the first wireless access point, associated header information to the packet received from the second wireless access point.

Twelfth Exemplary Embodiment

When the wireless communication system further includes a system controller for controlling operations of the first and second access points, the computer-readable medium storing the program may cause a computer to further perform:
control packet receiving processing for receiving, by the first wireless access point, control packets from the system controller; and
transmission decision processing for selecting, from the control packets from the system controller, a predetermined kind of control packets and not transmitting the control packets to the second wireless access point and transmitting control packets of a kind other than the predetermined kind to the second access point.

Thirteenth Exemplary Embodiment

Favorably, in the transmission decision processing, the first wireless access point may compress a control packet and transmit the control packet to the second wireless access point.

Fourteenth Exemplary Embodiment

The program in the computer-readable medium may cause a computer to further perform:
communication packet receiving processing for receiving by the first wireless access point a packet to be sent to the second wireless access point;
associated header information removing processing for removing, if the packet includes associated header information added thereto, the associated header information; and
transmitting processing for transmitting to the second wireless access point the packet from which the associated header information removing processing has removed the associated header information.

An exemplary advantage according to the invention is that it is possible to efficiently use the backhaul wireless communication line in a wireless network in which the system is managed in a centralized fashion by reducing the traffic such as control packets and associated header information on the backhaul wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system, comprising:
a first wireless access point connected via a wired communication line to a backbone communication line;
a second wireless access point coupled through a wireless communication with the backbone communication line; and
a system controller that controls operations of the first and second wireless access points,
wherein the first wireless access point comprises;
a transmission decision unit that selects, from control packets received from the system controller and addressed to the second wireless access point, a predetermined kind of control packets and sends the control packets except the predetermined kind of control packets to the second wireless access point;
an associated header information removing unit that removes, at a reception of a packet to be sent to the second wireless access point with associated header information added thereto, the associated header information; and a transmission unit that transmits to the second wireless access point the packet from which the associated header information removing unit has removed the associated header information, wherein the transmission decision unit comprises determining whether or not to transfer each of the control packets which are addressed to the second wireless access point by selecting, from control packets received from the system controller and addressed to the second wireless access point, the predetermined kind of control packets and sending the control packets except the predetermined kind of control packets to the second wireless access point.

2. The wireless communication system in accordance with claim 1, wherein the second wireless access point comprises a transfer unit that transfers a packet from a station belonging thereto to the first wireless access point, wherein the first wireless access point comprises an associated header information adding unit that adds associated header information to the packet received from the second wireless access point.

3. The wireless communication system in accordance with claim 1, wherein the first wireless access point comprises a compression and transmission unit that compresses a control packet to the second wireless access point and transmits the control packet thereto.

4. A wireless communication system, comprising:

a first wireless access point connected via a wired communication line to a backbone communication line; and a second wireless access point coupled through a wireless communication with a backbone communication line, wherein the second wireless access point comprises a transfer unit that transfers a packet from a station belonging thereto to the first wireless access point, the packet being transferred as it is without adding an information item to the packet, and wherein the first wireless access point comprises:

an associated header information adding unit that adds associated header information to the packet received from the second wireless access point;

an associated header information removing unit that removes, at a reception of a packet to be sent to the second wireless access point with associated header information added thereto, the associated header information;

a transmission unit that transmits to the second wireless access point the packet from which the associated header information removing unit has removed the associated header information; and a transmission decision unit that selects, from the control packets received from the system controller and addressed to the second wireless access point, a predetermined kind of control packets and sends the control packets except the predetermined kind of control packets to the second wireless access point.

5. The wireless communication system in accordance with claim 4, wherein the first wireless access point comprises a compression and transmission unit that compresses a control packet to the second wireless access point and transmits the control packet thereto.

6. A wireless access point connected to a system controller controlling operation of the wireless access point and a second wireless access point coupled through a wireless communication with a backbone communication line, said wireless access point comprising:

a transmission decision unit that selects, from control packets received from the system controller and addressed to the second wireless access point, a predetermined kind of control packets and sends the control packets except the predetermined kind of control packets to the second wireless access point;

an associated header information removing unit that removes, at a reception of a packet to be sent to the second wireless access point with associated header information added thereto, the associated header information; and a transmission unit that transmits to the second wireless access point the packet from which the associated header information removing unit has removed the associated header information, wherein the transmission decision unit comprises determining whether or not to transfer each of the control packets which are addressed to the second wireless access point by selecting, from control packets received from the system controller and addressed to the second wireless access point, the predetermined kind of control packets and sending the control packets except the predetermined kind of control packets to the second wireless access point.

7. The wireless access point in accordance with claim 6, further comprising an associated header information adding unit that adds associated header information to the packet received from the second wireless access point.

8. The wireless access point in accordance with claim 6, further comprising a compression and transmission unit that compresses a control packet to the second wireless access point and transmits the control packet thereto.

9. A wireless access point connected via a wireless communication line to a second wireless access point coupled through wireless communication with a backbone communication line, comprising an associated header information adding unit that adds associated header information to a packet received from the second wireless access point, wherein the packet is originated from a station belonging to the second wireless access point, and is transferred as it is from the second wireless access point to the wireless access point without adding an information item to the packet, the wireless access point further comprising a transmission decision unit that selects, from control packets received from the system controller and addressed to the second wireless access point, a predetermined kind of control packets and sends the control packets except the predetermined kind of control packets to the second wireless access point, an associated header information removing unit that removes, at a reception of a packet to be sent to the second wireless access point with associated header information added thereto, the associated header information, and a transmission unit that transmits to the second wireless access point the packet from which the associated header information removing unit has removed the associated header information.

10. The wireless access point in accordance with claim 9, further comprising a compression and transmission unit that compresses a control packet to the second wireless access point and transmits the control packet thereto.

11. A communication control method for use with a wireless communication system comprising a first wireless access point connected via a wired communication line to a backbone communication line, a second wireless access point coupled through wireless communication with a backbone communication line, and a system controller for controlling operations of the first and second wireless access points, the method comprising:

receiving, by the first wireless access point, control packets from the system controller;

selecting, from the control packets received from the system controller and addressed to the second wireless access point, a predetermined kind of control packets and transmitting the control packets except the predetermined kind of control packets to the second wireless access point;

receiving by the first wireless access point a packet to be sent to the second wireless access point;

removing, if the packet includes associated header information added thereto, the associated header information;

transmitting to the second wireless access point the packet from which the associated header information has been removed; and determining whether or not to transfer each of the control packets which are addressed to the second wireless access point by selecting, from control packets received from the system controller and addressed to the second wireless access point, the predetermined kind of control packets and sending the control packets except the predetermined kind of control packets to the second wireless access point.

12. The communication control method in accordance with claim 11, further comprising:

transferring by the second wireless access point a packet from a station belonging thereto to the first wireless access point; and adding, by the first wireless access point, associated header information to the packet received from the second wireless access point.

13. The communication control method in accordance with claim 11, said selecting and transmitting control packets to the second access point comprising:

compressing by the first wireless access point a control packet to the second wireless access point; and transmitting the control packet thereto.

14. A communication control method for use with a wireless communication system comprising a first wireless access point connected via a wired communication line to a backbone communication line and a second wireless access point coupled through wireless communication with a backbone communication line, the method comprising:

transferring, by the second wireless access point, a packet from a station belonging thereto to the first wireless access point, the packet being transferred as it is without adding an information item to the packet;

adding, by the first wireless access point, associated header information to the packet received from the second wireless access point;

a system controller for controlling operations of the first and second access points, the method further comprising:

receiving, by the first wireless access point, control packets from the system controller; and selecting, from the control packets from the system controller, a predetermined kind of control packets and transmitting control packets except the predetermined kind of control packets to the second wireless access point.

15. The communication control method in accordance with claim 14, said selecting and transmitting control packets to the second access point further comprising:

compressing by the first wireless access point a control packet to the second wireless access point; and transmitting the control packet thereto.

16. The communication control method in accordance with claim 14, further comprising:

receiving by the first wireless access point a packet to be sent to the second wireless access point;

removing, when the packet includes associated header information added thereto, the associated header information; and transmitting to the second wireless access point the packet from which the associated header information has been removed.

17. A tangible computer-readable medium having stored thereon a communication control program for use with a wireless communication system comprising a first wireless access point connected via a wired communication line to a backbone communication line, a second wireless access point coupled through wireless communication with a backbone communication line, and a system controller for controlling operations of the first and second wireless access points, the program causing a computer to perform a method comprising:

receiving by a control packet receiving processing, by the first wireless access point, control packets from the system controller;

selecting by a transmission decision processing, from the control packets received from the system controller and addressed to the second wireless access point, a predetermined kind of control packets and transmitting the control packets except the predetermined kind of control packets to the second wireless access point;

receiving, by a communication packet, processing for receiving by the first wireless access point a packet to be sent to the second wireless access point;

removing by an associated header information processing when the packet includes associated header information added thereto, the associated header information; and transmitting processing for transmitting to the second wireless access point the packet from which the associated header information removing processing has removed the associated header information, wherein the transmission decision processing comprises determining whether or not to transfer each of the control packets which are addressed to the second wireless access point by selecting, from control packets received from the system controller and addressed to the second wireless access point, the predetermined kind of control packets and sending the control packets except the predetermined kind of control packets to the second wireless access point.

18. The computer-readable medium in accordance with claim 17, the method further comprising:

transfer processing for transferring by the second wireless access point a packet from a station belonging thereto to the first wireless access point; and adding by an associated header information adding processing, by the first wireless access point, associated header information to the packet received from the second wireless access point.

19. The computer-readable medium in accordance with claim 17, wherein in the transmission decision processing, the first wireless access point compresses a control packet and transmits the control packet to the second wireless access point.

20. A tangible computer-readable medium having communication control program for use with a wireless communication system comprising a first wireless access point connected via a wired communication line to a backbone communication line and a second wireless access point coupled through wireless communication with a backbone communication line, the program causing a computer to perform a method comprising:
   transfer processing for transferring by the second wireless access point a packet from a station belonging thereto to the first wireless access point, the packet being transferred as it is without adding an information item to the packet;
   adding by associated header information adding processing, by the first wireless access point, associated header information to the packet received from the second wireless access point;
   communication packet receiving processing for receiving by the first wireless access point a packet to be sent to the second wireless access point;
   associated header information removing processing for removing, when the packet includes associated header information added thereto, the associated header information; and
   transmitting processing for transmitting to the second wireless access point the packet from which the associated header information removing processing has removed the associated header information.

21. The computer-readable medium in accordance with claim 20, wherein the wireless communication system further comprises a system controller for controlling operations of the first and second access points, the method further comprising:
   receiving, by control packet receive processing by the first wireless access point, control packets from the system controller; and
   selecting, by transmission decision processing from the control packets from the system controller, a predetermined kind of control packets and transmitting the control packets except the predetermined kind of control packets to the second wireless access point.

22. The computer-readable medium in accordance with claim 21, wherein in the transmission decision processing, the first wireless access point compresses a control packet and transmits the control packet to the second wireless access point.

23. A wireless communication system, comprising:
   a first wireless access point connected via a wired communication line to a backbone communication line;
   a second wireless access point coupled through a wireless communication with a backbone communication line; and
   a system controller that controls operations of the first and second wireless access points,
   wherein the first wireless access point comprises;
   a transmission decision means for selecting, from control packets received from the system controller and addressed to the second wireless access point, a predetermined kind of control packets and sending the control packets except the predetermined kind of control packets to the second wireless access point;
   an associated header information removing means for removing, at a reception of a packet to be sent to the second wireless access point with associated header information added thereto, the associated header information; and
   a transmission means for transmitting to the second wireless access point the packet from which the associated header information removing means has removed the associated header information,
   wherein the transmission decision means comprise determining whether or not to transfer each of the control packets which are addressed to the second wireless access point by selecting, from control packets received from the system controller and addressed to the second wireless access point, the predetermined kind of control packets and sending the control packets except the predetermined kind of control packets to the second wireless access point.

24. A wireless communication system, comprising:
   a first wireless access point connected via a wired communication line to a backbone communication line; and
   a second wireless access point coupled through wireless communication with a backbone communication line,
   wherein the second wireless access point comprising transfer means for transferring a packet from a station belonging thereto to the first wireless access point, the packet being transferred as it is without adding an information item to the packet,
   wherein the first wireless access point comprises:
   associated header information adding means for adding associated header information to the packet received from the second wireless access point;
   transmission decision means for selecting, from control packets received from the system controller and addressed to the second wireless access point, a predetermined kind of control packets and sending the control packets except the predetermined kind of control packets to the second wireless access point;
   an associated header information removing means that removes, at a reception of a packet to be sent to the second wireless access point with associated header information added thereto, the associated header information; and
   a transmission means that transmits to the second wireless access point the packet from which the associated header information removing unit has removed the associated header information.

\* \* \* \* \*

UNITED STATES PATENT AND TRADEMARK OFFICE
CERTIFICATE OF CORRECTION

PATENT NO.        : 8,718,027 B2
APPLICATION NO.   : 11/822745
DATED             : May 6, 2014
INVENTOR(S)       : Hideki Kurokawa It is certified that error appears in the above-identified patent and that said Letters Patent is hereby corrected as shown below:

On the Title Page:

Item (73) ASSIGNEE should read:
NEC INFRONTIA CORPORATION   KAWASAKI, KANAGAWA, JAPAN Signed and Sealed this
First Day of July, 2014

Michelle K. Lee
*Deputy Director of the United States Patent and Trademark Office*